ately disadvantageous since they tend to clog up with carbonaceous deposits early in the operation of the process.

It is accordingly an object of the present invention to provide an improved process for the production of ethyl chloride and vinyl chloride. Another object is to provide a process of the above type wherein conjoint chlorination and dehydrochlorination processes are employed. Still another object is to provide a more efficient dehydrochlorination process wherein the formation of carbonaceous deposits in the reactors is minimized. A more specific object is to provide a catalytic dehydrochlorination process which can convert 1,1-dichloroethane to vinyl chloride at moderate temperatures. A still further object is to provide a process which utilizes the hydrogen chloride, produced in a reaction of the above type, as a chlorinating agent. Other and further objects and advantages of this invention will be apparent from the following description.

We have now found that ethyl chloride and vinyl chloride can be economically and efficiently produced with a minimum production of undesirable by-products if a chlorination reaction and a dehydrochlorination reaction are carried out in adjacent reaction zones employing a common fluidized solids reactor bed, and if the reactants passing from the chlorination to the dehydrochlorination zone are enriched with an additional feed of dichloroethanes, preferably by recycle of unreacted dichloroethanes from the product stream. This unique combination of process steps not only provides a heat transfer efficiency not heretofore obtainable by external means, but materially improves both the quality and the yield of product obtained. This product is essentially free of tars or carbonaceous materials normally formed by prior processes.

More particularly, the process of this invention comprises reacting chlorine and ethane in the chlorination reaction zone at an elevated temperature to effect the conversion of ethane to essentially mono- and dichloroethanes and hydrogen chloride. The reaction products are passed to the dehydrochlorination zone where at least a portion of the dichloroethanes are dehydrochlorinated to form vinyl chloride and hydrogen chloride. In the present invention, the process utilizes the heat liberated by the exothermic ethane chlorine reaction to supply at least a part of the heat requirements for the endothermic cracking reaction while simultaneously providing an internal cooling means for the chlorination reaction. This efficient transfer of heat within and between the two reaction zones is obtained by employing the same fluidized solids reactor bed for both reaction zones. The reaction products and unreacted materials are taken overhead and passed to a primary fractionation zone wherein the unreacted dichloroethanes are separated and at least a portion thereof is recycled to the dehydrochlorination zone. By means of such a separation and recycle operation in conjunction with the conjoint operation of the chlorination and dehydrochlorination reaction zones, the essentially complete conversion of ethane to ethyl chloride and vinyl chloride is efficiently and economically accomplished. If desired, additional quantities of ethyl chloride can be obtained by reacting the major by-product of this process, i. e. hydrogen chloride, with ethylene in a subsidiary reaction zone under reaction conditions suitable for the hydrochlorination of ethylene.

If desired, in some cases a selective dehydrochlorination catalyst, for promoting the dehydrochlorination of dichloroethanes (particularly 1,1-dichloroethane) in the presence of ethyl chloride is employed as at least a part of the fluidized bed. When employing such a catalyst, the reaction temperatures employed are normally considerably lower than those found suitable under non-catalytic conditions, thereby providing even more preferred chlorination and dehydrochlorination operating conditions for the production of ethyl chloride and vinyl chloride.

The present invention, therefore, provides a unique means of efficiently and economically controlling an exothermic chlorination reaction by effectively utilizing the heat evolved therein to concurrently dehydrochlorinate a dichloroethane to an additional desirable product, i. e. vinyl chloride. This improved method of operation obviates the necessity for the use of costly external heating means to effect the dehydrochlorination reaction since a large proportion or all of the heat required for maintaining the reaction temperature is obtained from the chlorination reaction and efficiently transferred internally to the dehydrochlorination reaction zone. Moreover, by employing the process of the present invention it is now possible to expeditiously conduct and control two separate reactions within a single fluidized solids reactor bed and thereby efficiently produce two desirable products with a minimum production of undesirable by-products. The present invention also provides an extremely versatile process since the proportions of ethyl chloride and vinyl chloride obtained therefrom are easily varied by controlling either the chlorine to ethane feed ratio, the chlorination reaction temperature, the amount of dichloroethane fed to the dehydrochlorination zone, the amount of ethyl chloride recycled to the chlorination zone to form dichloroethanes or a combination of any of these conditions.

The process offers the further advantage that considerably larger amounts of ethane can be efficiently reacted with chlorine per unit of time and space than has been possible by prior processes. This advantageous feature results from the ability to employ high molar ratios of chlorine to ethane, i. e. up to about 1.5:1, and pressures up to about 30 atmospheres, in the present invention, while maintaining an effective control over the reaction as well as increasing the production of useful and desirable products.

An advantageous feature of the present invention is its great versatility with respect to its operation. Thus, when desired, the hydrogen chloride formed in the above noted reaction zones is separated from the effluent and recycled along with oxygen or an oxygen containing gas from an outside source to the chlorination reaction zone. Within this zone these reactants are contacted with a suitable catalyst at a temperature between about 300° C. to 650° C. thereby effecting successively, the oxidation of the hydrogen chloride to chlorine which reacts with ethane to form a product comprising essentially ethyl chloride, dichloroethanes and additional hydrogen chloride. Suitable catalysts for this reaction comprise the chlorides, oxides, and oxy chlorides of metals having variable valences, preferably of the metals of the first, second and third transition series of the elements of the periodic table. These are used as such, in combination with various promoter substances and in combination with or deposited upon carriers such as asbestos, pumice, clay, activated alumina, fuller's earth, and kieselguhr. The dry material is pulverized to form a finely divided solid which is employed in the fluidized state in the chlorination and dehydrochlorination reaction zones. The catalyst mass is maintained in a fluidized or suspended state within the reaction zones by the gaseous reactants themselves, i. e. chlorine, ethane, hydrogen chloride, dichloroethanes, an oxygen-containing gas such as pure oxygen or air, and in some cases by the additional recycle of ethyl chloride from the product stream. Concurrent with the addition of recycled hydrogen chloride to the chlorination zone, there is also an introduction of a feed stream containing dichloroethanes to the dehydrochlorination reaction zone.

A particular advantage of the present invention resides in the ability to conduct an exothermic hydrogen chloride oxidation reaction in conjunction with an exothermic ethane chlorination reaction while maintaining controlled reaction conditions without the employment of complex and costly temperature controlling devices. The successful operation of such a heretofore difficultly operable process results from the employment in the present invention of adjacent exothermic chlorination and endothermic dehydrochlorination reaction zones in combination with an efficient heat transfer medium, i. e. fluidized catalyst reactor bed, between and within the two reaction zones. Under these conditions, control of suitable reaction temperatures within the reaction zone is achieved without the necessity of using expensive auxiliary heat removal means for the chlorination reaction zone.

The process may be illustrated by the following equations wherein M represents a metal of variable valence as more fully defined below:

A.
(1) $MCl + \frac{1}{2}O_2 \rightarrow \frac{1}{3}MCl_3 + \frac{1}{3}M_2O_3$
(2) $\frac{1}{3}M_2O_3 + 2HCl \rightarrow \frac{2}{3}MCl_2 + H_2O$
(3) $MCl_3 + RH \rightarrow MCl + RCl + HCl$
or B.
(4) $MCl_2 + \frac{1}{2}O_2 \rightarrow MOCl_2$
(5) $MOCl_2 + 2HCl \rightarrow MCl_4 + H_2O$
(6) $MCl_4 + RH \rightarrow MCl_2 + MCl + HCl$
or C.
(7) $MO_2 + 2HCl \rightarrow MOCl_2 + H_2O$
(8) $MOCl_2 + \frac{1}{2}O_2 \rightarrow MO_2Cl_2$
(9) $MO_2Cl_2 + RH \rightarrow MO_2 + RCl + HCl$
or D.
(10) $MOCl + 2HCl \rightarrow MCl_3 + H_2O$
(11) $MCl_3 + \frac{1}{2}O_2 \rightarrow MOCl_3$
(12) $MOCl_3 + RH \rightarrow MOCl + RCl + HCl$ When desired, the oxidation and chlorination steps of this oxidated chlorination of ethane can be conducted in separate reactors. Thus, the hydrogen chloride and oxygen are contacted with the reduced form of the catalyst in a first reactor to form the higher valence form of the catalyst which is then transferred to the chlorination reaction zone of this process. Under the reaction conditions employed for the process, chlorine is liberated with the formation of the reduced valence form of the catalyst which is recycled to the first reactor to be regenerated as a chlorination agent. This particular operation is desirable when contact between the hydrocarbon material and oxygen at elevated temperatures and pressures are to be avoided because of deleterious side reactions and the production of difficultly purifiable product streams. Another advantageous feature of this particular manner of operating the process results from being able to operate the regeneration step, i. e., the oxidation step, at pressures substantially below those sometimes employed in the chlorination reaction zone.

Choice of either of these methods of operating a process employing the oxidative chlorination of ethane, i. e. in one reactor or two reactors, depends primarily on such economic considerations as the cost of compression of the gases involved, corrosion effects, problems in transportation of catalyst material between reactors, cost of separation of hydrogen chloride from the product stream and the like.

It has also been found particularly advantageous to employ a material which has dual catalytic properties, i. e. catalytic properties for the dehydrochlorination of dichloroethanes as well as for the catalytic oxidation of hydrogen chloride to chlorine, as at least a portion of the fluidized solids reactor bed of the process of this invention. In this case, the reaction temperatures necessary for the combined process, i. e. chlorination and dehydrochlorination, are considerably reduced below those heretofore thought suitable for a process of this type. Thus, temperatures between about 300° C. and 500° C. and preferably between about 350° C. and 475° C. have been found to be suitable for such an operation.

In practicing this invention, the chlorination and dehydrochlorination reaction zones are contiguous areas of a fluidized solids reactor bed confined within a unitary reactor. In starting the process, the fluidized solids are preheated to a temperature within a few degrees of the desired reaction temperature and preferably by the passage of heated gases through the reaction zones. In this particular operation, chlorine and ethane are premixed to form a mixture having a desirable chlorine to ethane mole ratio, i. e 0.3:1 to 1.5:1. This mixture is then fed into the chlorination reaction zone wherein it is subjected to suitable chlorination conditions such as temperatures above about 300° C. and pressures up to about 30 atmospheres to convert the ethane to essentially ethyl chloride and dichloroethanes. The reaction products and unreacted materials from the chlorination zone are then passed along with an additional quantity of dichloroethane into the dehydrochlorination zone which is maintained at a slightly lower reaction temperature than the chlorination zone due to the endothermic nature of the reaction occurring therein. The temperature gradient bewteen these zones normally does not exceed about 25° C. while all other reaction conditions remain essentially the same. Under these reaction conditions at least a portion of the dichloroethanes are dehydrochlorinated to form vinyl chloride and hydrogen chloride. The gaseous effluent comprising unreacted ethane, hydrogen chloride, ethyl chloride, vinyl chloride, dichloroethanes, ethylene and some volatile impurities is taken from the reactor and passed into a suitable product separation zone.

The product separation zone can comprise, for example, an ordinary vapor-liquid distillation or an extractive distillation step. When employing the usual liquid-vapor condensation type of separation, the products of both of these reaction zones are preferably fractionated together in a combined product separation system thereby reducing the number of fractionating towers and steps required for this operation. In other modifications of this process, however, an individual separation and recovery section can be provided for the reaction products of each reaction zone particularly when it is desirable to reduce the physical dimensions of the equipment employed.

In the operation of the preferred embodiment of this invention the products of both reaction zones are introduced into a common fractionating system wherein the dichloroethanes are separated from the other more volatile components in a primary fractionating zone and at least a portion thereof is recycled to the dehydrochlorination zone to be converted to vinyl chloride. In some cases, it may be desirable to recover part of the heat from the reaction products by passing them through a heat exchanger prior to their entry into the fractionating system. By this means, the product gases can be made to indirectly contact the incoming additional feed material to the dehydrochlorination reaction zone thereby providing at least a portion of the heat necessary for this endothermic reaction while simultaneously reducing the heat load on the product separation system.

The unreacted ethane which is recovered from the overhead vapor stream of the primary fractionator can be recycled to the chlorination zone along with fresh ethane feed and chlorine. In some forms of this invention, however, both the unreacted ethane and the hydrogen chloride by-product from the reaction zones are recycled to the chlorination zone to effect the oxidative chlorination of ethane with the hydrogen chloride in the presence of oxygen and a suitable catalyst as described hereinafter. Other variations of this particular process operation wherein hydrogen chloride is utilized as a source of chlorine have been noted above and are also employed in the present invention. In all of the above described embodiments of this invention, the reactants in the chlorination zone are generally subjected to a temperature between about 300 to about 650° C. for a time sufficient to substantially effect the essentially complete conversion of the feed chlorine or the nascent chlorine to ethyl chloride, dichloroethanes, and hydrogen chloride.

The dichloroethanes separated in the above noted primary fractionating zone are recycled as a feed, preferably in the vapor state, to the dehydrochlorination zone to effect their conversion to vinyl chloride and hydrogen chloride. In a thermal non-catalytic operation, it is generally desirable to maintain a temperature in the dehydrochlorination reaction zone of between about 475° C. to 650° C. and more preferably, between about 500° C. to 600° C. in order to obtain an optimum conversion of dichloroethanes to vinyl chloride in a desirable reaction time, i. e., up to about 25 seconds. However, as hereinbefore noted, it is generally preferred to employ a selective dehydrochlorination catalyst as a component of the fluidized solids reactor bed thereby permitting the use of considerably lower dehydrochlorination reaction temperatures with an attendant decrease in chlorination reaction zone temperature as well. The lowered reaction temperatures employed result in improved conversions of the reactants in both reaction zones to desirable products, i. e., ethyl chloride and vinyl chloride. Thus, in the presence of such a dehydrochlorination catalyst, the reaction temperature employed is generally between about 300° C. and 475° C. and more preferably between about 350° C. and 450° C. In either operation, thermal or catalytic, the heat necessary for the endothermic dehydrochlorination reaction is primarily obtained from two sources in the process of this invention. A primary source is the heat liberated in the chlorination reaction which is made available for the dehydrochlorination reaction by means of an efficient transfer of heat by the fluidized solids reactor bed. When relatively small quantities of dichloroethanes are fed to the dehydrochlorination zone, this source of heat is sufficient to maintain the reaction temperature required for a desirable conversion to vinyl chloride. In most circumstances, however, it is generally desirable to introduce additional heat to the reaction zone by means of preheating the reacting gases, i. e., ethane, chlorine, dichloroethanes or hydrogen chloride, to a temperature sufficient to maintain the desirable reaction temperatures in the reaction zones. The temperature to which the feed gases are preheated depends on a number of different factors. Thus, the amount of heat available from the chlorination reaction is a function not only of the mass of the reactants involved, but also varies directly with the chlorine to ethane molar feed ratio employed. Similarly, the heat required for the dehydrochlorination reaction is largely a function of the mass of the dichloroethane fed to the dehydrochlorination reaction zone as well as the degree of conversion of this material to vinyl chloride per pass. In preferred embodiments of this invention, the heat liberated in the chlorination reaction is utilized solely for the endothermic heat of reaction in the dehydrochlorination zone and not as a heat source for maintaining the temperatures of the reaction zone. Thus, the dichloroethane feed to the dehydroclorination reaction zone is preferably vaporized prior to its entry into the reaction zone thereby permitting the maximum utilization of the available heat for the dehydrochlorination reaction proper. Preferably, it is desirable to preheat the various feed streams to a temperature below that at which any substantial reaction will occur prior to their entry into the reaction zones. Thus, the preheat temperature of a mixed ethane and chlorine feed stream should preferably not exceed about 280° C., above which temperature, a substantial reaction between ethane and chlorine occurs. Similarly, it has been found desirable to set a maximum preheat temperature of about 500° C. for the dichloroethane feed stream in order to prevent undesirable degradation and carbonization of this material in the feed lines. As herein noted, the preheat temperatures of the various feed streams vary with the process operation and generally involve a temperature in the range between about 25° C. to about 280° C. for the chlorine and ethane feed streams and about 25° C. to 500° C. for the dichloroethane feed stream.

The fluidized mass employed in the reaction zones is not too critical but preferably should be one which has desirable fluidization characteristics such as relatively low bulk density. Sand or silicon carbide, consisting substantially of particles of size of about 50 to 250 mesh have been found particularly useful for this purpose. Other suitable and well-known media which can be used are graphite, alumina, pumice, silica, mullite, silica alumina gel, porous earths such as kieselguhr or fuller's earth, and several other well-known non-vesicular solid media. When employing a fluidized bed reactor of the above type, the reactions can advantageously be carried out under approximately isothermal conditions wherein the temperature in all parts of the fluid mass, i. e. the chlorination and dehydrochlorination reaction zones, differs by no more than about 25° C. and preferably below 5 to 10° C. This permits a continuous control over the temperature conditions of the reactions to an extent heretofore unobtainable in the conventional tubular type or packed bed type reactors.

As has been stated before, a preferred means of conducting the process of this invention involves the use of a fluidizing media containing at least a portion of a selective cracking catalyst which will convert dichloroethane to vinyl chloride and hydrogen chloride without effecting any cracking of ethyl chloride. This type of operation is particularly desirable since it permits the employment of considerably lower operating temperatures in the reaction zone which are favorable to a more efficient operation of the chlorination reaction. Further, the use of lower temperatures eliminates the need for the use of expensive materials of construction which must be used at the higher operating temperatures. Fluidizing media having such desirable catalytic properties are activated alumina, Filtrol, and metallic halides normally employed as catalysts in Friedel-Crafts type reactions. Some specific examples of such metallic halides are aluminum chloride, cerium chloride, boron trifluoride, ferric chloride, and zinc bromide. When employing such a catalyst, a portion of the dichloroethane is dehydrochlorinated in situ as it is formed in the chlorination reaction. This extremely desirable operation reduces the volume of dichloroethanes which must be recycled or circulated to the dehydrochlorination reaction zone for a desired quantity of vinyl chloride to be produced therein.

As noted above, catalysts suitable for use in the oxidative chlorination of ethane comprise the chlorides, oxychlorides and oxides of the metals of variable valence of the first, second and third transition series of the elements of the periodic table. Representative metals comprise titanium, vanadium, chromium, manganese, iron, cobalt, nickel, copper, zirconium, molybdenum, palladium, cadmium, tungsten, platinum and mercury. Of these metals iron and copper are preferred. Mixtures of any of the above compounds can also be employed. Although these can be used alone, it is preferable in most cases to deposit them on various carriers such as asbestos, pumice, clay, activated alumina, silica-gel, alumina-silicates, fuller's earth, kieselguhr and other diatomaceous earths. In addition to the metal compounds noted above, the catalytic materials employed can also contain as suitable promoting agents the chlorides of tin, antimony and the alkali and alkaline earth metals.

The particle size of the fluidizing media while not especially critical, is important. It is preferred to employ a solid material having an average particle size of between about 50 to 250 mesh and preferably between about 70 to 150 mesh. Particles much less than 250 mesh in size are sometimes suitable but tend to be entrained with the product vapors whereas particles greater than 50 mesh in size generally result in mechanical difficulties in the fluidization technique.

A wide range of pressures are suitable for both reactions of this invention and it is generally desirable that the pressure employed be above atmospheric. Increasing reaction pressure not only increases the reaction rate of the chlorination reaction, but also results in an unexpected improvement in the conversion of the reactants to the desired products. Generally, pressures in the range between about 2 to 30 atmospheres can be employed while pressures between about 5 and 20 atmospheres have been found to be desirable. However, in preferred embodiments of this invention it has been found particularly desirable to employ pressures in the range between about 6 to 15 atmospheres as the most optimum operating pressures for the maximum conversion of the reactants to the desired products, i. e. ethyl chloride, dichloroethanes, and vinyl chloride, while decreasing the concomitant production of ethylene. Moreover, while employing high chlorine to ethane mole ratios, i. e. above about 0.5:1, pressure between about 6 and 8 atmospheres have been found to be especially preferred for the minimum production of undesirable by-products, especially ethylene. Further, the employment of such elevated pressures permits a higher mass through-put through a reactor thereby permitting a reduction in reactor size with attendant savings in construction expense.

The mole ratio of chlorine to ethane in the feed stream to the chlorination reaction zone is important, but not critical. In general, it can vary between about 0.25:1 to 1.5:1, chlorine: ethane. The particular mole ratio employed determines to a large extent the proportion of reacted ethane which is converted to ethyl chloride and also the quantity of dichloroethanes. To obtain a high yield of ethyl chloride on the basis of ethane reacted, a chlorine to ethane feed ratio of 0.25:1 to 0.6:1 is desirable. In a specific embodiment of this invention a mole ratio of 0.3:1 to 0.5:1 is especially desirable in order to produce a maximum conversion of reacted ethane to ethyl chloride while maintaining the concomitant production of polychlorinated ethanes at an absolute minimum. This particular operation is employed when a maximum production of ethyl chloride is desirable and when a major proportion of the dichloroethanes employed in the dehydrochlorination reaction can be obtained from some other source. When it is desired to produce a chlorination product stream containing an increased proportion of higher chlorides of ethane, i. e. dichloroethanes, a chlorine to ethane mole ratio of about 0.65:1 to 1.5:1 and preferably between about 0.8:1 to 1.1:1 is employed.

It has been found that at the elevated temperature range preferred for the chlorination reaction the reacting materials require only a brief contact period for complete reaction. The reaction time required for this step of the combined process is surprisingly low and under the operating conditions of this invention, substantially all the chlorine fed to the reaction zone is reacted within a reaction contact time of about 3 seconds or less. Reaction times from 0.1 to 2 seconds have been found suitable for this reaction although the preferred range of reaction contact time is from about 0.15 to 1.5 seconds. Shorter contact periods can be employed at the more elevated temperatures and, conversely, longer contact periods can be employed at the lower reaction temperatures. In the dehydrochlorination reaction zone the reacting materials are subjected to the elevated reaction temperatures for a contact period or not greater than about 25 seconds. In general, the main effect of changing the reaction contact time is to change the temperature at which the approximately same conversion of the dichloroethane to vinyl chloride is obtained. Thus, when employing an approximate reaction temperature of about 600° C. in the dehydrochlorination reaction zone the degree of conversion obtained after a contact time of 1 second is approximately the same as that obtained when employing a reaction temperature of about 500° for a contact time of about 15 seconds. Too long a contact time at the higher reaction temperatures results in excessive degradation of both the reactants and the products with the formation of carbonaceous and tarry materials. Too short a contact time for the reaction temperature employed results in a very low conversion of the dichloroethane to vinyl chloride and the necessity to recycle large volumes of dichloroethane in order to obtain a desirable yield of vinyl chloride. Generally, a reaction contact time of from about 0.3 to 20 seconds and preferably between about 0.8 and 10 seconds is employed for maximum conversions with a minimum formation of undesirable by-products.

The velocity of the reactants through the reaction zones is not critical, but should be adequate to support or fluidize the finely divided solids in the required suspended condition as well as provide the proper contact time for the reaction temperature employed. Generally, the precise velocity needed will vary depending upon the particle size and density of the material employed. For the preferred range of particle size employed, the gas velocity can be varied within the range of 0.2 to 4.0 feet per second and more preferably between about 1.0 to 3.0 feet per second; the lower velocity being suitable for the finer sizes of fluidizing media employed. These velocities are the superficial linear velocities and are calculated for the reactant gases at the reaction conditions employed and are based upon the gas flow through the empty reactor. In the dehydrochlorination zone the two factors of temperature and superficial linear velocity are somewhat interdependent. An increase of temperature at a given linear velocity raises the conversion of dichloroethane to vinyl chloride until a maximum value is reached, i. e. about 95 percent conversion to vinyl chloride. A further increase of temperature produces a diminishing yield of vinyl chloride since the product is degraded at these elevated temperatures to hydrogen chloride and acetylene and in some cases to carbonaceous materials. In general the main effect of changing the superficial linear velocity is to change the reaction contact time for a given reactor size, thereby necessitating a change in the temperature at which comparable conversions of dichloroethane to vinyl chloride can be obtained. This property of the system provides for flexibility in the production of vinyl chloride since, within limits, the through-put may be lowered without affecting the product composition provided the temperature is correspondingly reduced. Again, when a higher through-put is desired this may be accomplished by correspondingly increasing the reaction temperature.

The following examples describe typical embodiments of this process and are given to illustrate the invention in more detail.

EXAMPLE I

The apparatus employed in this and the following examples consists of a vertical tubular reactor containing a finely divided solid of particle size 50 to 150 mesh present to the extent of about one-third the volume of the reactor. A solids disengaging space or section is attached to the reactor top thereby providing a means of separating entrained solids from the gas stream before it enters the product separation section. The chlorine and ethane are premixed prior to their entry into the bottom of the tubular reactor while the dichloroethane enters the reactor one-fourth of the reactor height from the chlorine and ethane feed line. Under gas flow conditions where fluidization occurs, the portion of the fluidized bed below the dichloroethane feed entry into the reactor constitutes the chlorination reaction zone while the portion of the fluidized solids bed above this feed point constitutes the dehydrochlorination reaction zone.

A mixture of chlorine and ethane is passed into the chlorination reaction zone where they react with each other under the conditions of temperature and pressure employed therein. The product stream from the chlorination zone then enters the dehydrochlorination reaction zone where it is enriched with additional dichloroethanes entering via the dichloroethane feed line. The exit gases from the disengaging zone are passed through a separation section wherein the dichloroethanes are condensed and removed as a liquid which is recycled as needed to the dehydrochlorination zone. Prior to being introduced into the reaction zone, the dichloroethanes are vaporized and preheated to a desired temperature determined by the process conditions employed in a particular process operation.

In a series of runs mixtures of chlorine and ethane in the proportions shown in the following Table I were passed through the chlorination reaction zone and the products therefrom were then fed to the dehydrochlorination zone along with additional 1,1-dichloroethane. The total 1,1-dichloroethane entering the dehydrochlorination zone is also shown in Table I under the 1,1-dichloroethane column. In these runs, the flow of the feed gases is such that the reaction time within the chlorination zone was about 1 second and within the dehydrochlorination reaction zone for about 4 seconds. The reaction zone pressure is maintained at about 7 atmospheres.

*Table I*

| No. | Charge, Moles/Hour | | | Reaction Temp., °C. | Product, Moles/Hour Excess Ethane and Hydrogen Chloride Not Shown | | | | |
|---|---|---|---|---|---|---|---|---|---|
| | Ethane | Chlorine | 1,1-Dichloro-Ethane | | Ethylene | Ethyl Chloride | Vinyl Chloride | 1,1-Dichloro-Ethane | Others |
| 1 | 7.0 | 2.1 | 0.9 | 500 | 0.16 | 1.68 | 0.11 | 0.90 | 0.01 |
| 2 | 4.25 | 3.0 | 2.75 | 500 | 0.32 | 1.94 | 0.35 | 2.75 | 0.03 |
| 3 | 3.30 | 3.3 | 3.4 | 500 | 0.53 | 1.50 | 0.61 | 3.40 | 0.08 |
| 4 | 7.4 | 2.2 | 0.4 | 550 | 0.23 | 1.67 | 0.15 | 0.38 | 0.03 |
| 5 | 5.2 | 3.6 | 2.2 | 550 | 0.71 | 1.99 | 0.70 | 1.94 | 0.09 |
| 6 | 4.30 | 4.3 | 1.40 | 550 | 1.18 | 1.39 | 0.77 | 1.39 | 0.19 |

In all of the foregoing runs the chlorine conversion was essentially complete so that there was no chlorine present in the overhead gas stream. The beneficial effect of the present invention is evidenced by the formation of only extremely minute quantities of carbonaceous materials and other undesirable degradation products. Moreover, although it was necessary to preheat the feed materials in order to maintain the desired reaction temperature, these temperatures were much below those necessary to effect a reaction in either feed stream. While there is a temporary decrease in the temperature of the fluidized reactor bed at the point of injection of the additional dichloroethane feed, the temperature of the reactor bed as a whole through both reaction zones remains essentially constant, i. e. 500° C. and 550° C. in the above runs.

EXAMPLE II

The operation of the process of the present invention when employing a selective dehydrochlorination catalyst as the fluidizing media is demonstrated in this example.

Activated alumina having a particle size distribution between about 70 to 230 mesh is employed as the fluidized catalyst in the series of runs shown in Table II. The advantageous use of such a catalyst is pointedly demonstrated in the high conversion per pass of dichloroethane to vinyl chloride while employing a much lower reaction temperature than is ordinarily required for a thermal non-catalytic operation of this kind. The temperature employed in this series of runs was 375° C. and the contact time in the dehydrochlorination zone was 2 seconds, other reaction conditions and procedures being the same as in Example I with the exception of the flow rates of the feed materials which are shown in Table II.

Table II

| No. | Charge, Moles/Hour | | | Product, Moles/Hour Excess Ethane and Hydrogen Chloride Not Shown | | | | |
|---|---|---|---|---|---|---|---|---|
| | Ethane | Chlorine | 1,1-Di-chloro-Ethane | Ethylene | Ethyl Chloride | Vinyl Chloride | 1,1-Di-chloro-Ethane | Others |
| 7 | 61.5 | 18.5 | 20.0 | 0.68 | 20.48 | 10.80 | 10.80 | |
| 8 | 30.8 | 9.2 | 60.0 | 0.34 | 10.26 | 30.80 | 30.80 | |
| 9 | 42.1 | 37.9 | 20.0 | 3.05 | 22.43 | 12.96 | 12.55 | 0.16 |
| 10 | 26.3 | 23.7 | 50.0 | 1.90 | 14.01 | 26.84 | 26.59 | 0.10 |
| 11 | 33.3 | 46.7 | 20.0 | 6.71 | 12.79 | 16.55 | 14.79 | 1.10 |
| 12 | 20.0 | 30.0 | 50.0 | 4.03 | 7.68 | 28.93 | 27.88 | 0.67 |

Here again the effect of increasing the chlorine to ethane mole ratio is evidenced in an increase in the proportion of vinyl chloride to ethyl chloride produced. Further, due to the lower reaction temperatures employed in these runs, the temperatures of the feed materials are substantially below those employed in the runs shown in Table I.

Although the use of the 1,1-dichloroethane isomer is shown in the above examples, equally good results are obtained when the 1,2-dichloroethane isomer or mixtures of the two dichloroethane isomers are employed. Similarly, equally good results are obtained when aluminum chloride, cerium chloride, ferric chloride, zinc bromide, zinc chloride and Filtrol are employed as the selective dehydrochlorination catalysts in the runs of Example II.

Similar results to those obtained in the above examples are also obtained when ethane is oxidatively chlorinated with hydrogen chloride in the presence of catalysts hereinbefore described. When employing ferric chloride, zinc chloride or cerium chloride as an oxidation catalyst, reaction conditions and results comparable to those of Example II are obtained due to the dual catalytic nature of the catalysts.

Reaction temperatures as low as 475° C. and as high as 650° C. for a thermal and non-catalytic process operation provide comparable results to those obtained in Example I. When employing a selective dehydrochlorination catalyst in the fluidized reactor bed, reaction temperatures as low as 300° C. and as high as 475° C. result in equally good results as those obtained in Example II.

The benefits of the present invention are also obtained when chlorine to ethane mole ratios as low as 0.25:1 and as high as 1.5:1 are employed in runs similar to those given in Examples I and II above. Reaction pressures can vary within the limits of 2 and 30 atmospheres with equally advantageous results as those employed in the examples given. Similarly, equally good results are obtained when the dichloroethane fed to the dehydrochlorination zone comprises up to about 70 mole percent of the total feed, i. e. chlorine, ethane and dichloroethane, to the reaction zones.

Although the invention has been described with particular reference to the chlorination of ethane and dehydrochlorination of dichloroethanes it is to be understood that other saturated aliphatic organic compounds and their chlorinated derivatives can also be employed in other combination processes of this invention with equally good results. Thus, methane and carbon tetrachloride can be employed to yield the chlorinated methanes and tetrachloroethylene as products. Similarly, propane or propylene and dichloropropane when employed in this process give the chloropropanes and allyl chloride as the major products. Ethylene and dichloroethanes result in the formation of vinyl chloride and vinylidene chloride.

Having described the invention in full, no unnecessary limitations should be understood therefrom and the appended claims should be construed as broadly as permissible in view of the prior art.

We claim:

1. The improved process for manufacture of ethyl chloride and vinyl chloride comprising introducing a preheated gaseous mixture of chlorine and ethane to the bottom of a vertical reaction chamber, the reaction chamber including a bottom chlorination zone and a top dehydrochlorination zone established as hereafter defined, the gaseous mixture being fed at a rate providing a superficial linear velocity of from about 1 to about 3 feet per second at the temperature of reaction, the reaction chamber containing finely divided solids maintained in the fluidized state by the flow of gases in the reaction chamber, said solids being from about 50 mesh to 250 mesh in size and the temperature of the reaction chamber being maintained above about 300° C., the chlorine thereby substantially completely reacting with the ethane in the said bottom zone, to form ethyl chloride, dichloroethane and hydrogen chloride, a stream of vaporized preheated dichloroethanes being fed to the chamber at a vertical level at which the chlorine fed has substantially completely reacted, thereby establishing the bottom of the dehydrochlorination zone and forming feed gases to the dehydrochlorination, the quantity of dichloroethane being at least as high as the quantity of dichloroethane generated in the chlorination zone, the heat generated in the chlorination zone being transferred to the dehydrochlorination zone by the fluidized solids, and withdrawing reacted gases from the top of the dehydrochlorination zone.

2. The process of claim 1 further defined in that the chlorination zone is about one-third the volume of the dehydrochlorination zone.

References Cited in the file of this patent

UNITED STATES PATENTS

| | | |
|---|---|---|
| 2,183,036 | Amos | Dec. 12, 1939 |
| 2,299,441 | Vaughan et al. | Oct. 20, 1942 |
| 2,374,237 | Stanley et al. | Apr. 24, 1945 |
| 2,395,314 | Blumer | Feb. 19, 1946 |
| 2,443,673 | Atwell | June 22, 1948 |
| 2,569,923 | Cheney | Oct. 2, 1951 |
| 2,628,259 | Dirstine et al. | Feb. 10, 1953 |
| 2,642,381 | Dickinson | June 16, 1953 |